United States Patent
Kim (10) Patent No.: US 8,040,545 B2
(45) Date of Patent: Oct. 18, 2011

(54) METHOD AND SYSTEM FOR PRINTING CONTENT ACCORDING TO PRINT CAPABILITIES OF IMAGE FORMING APPARATUSES USING A DEVICE

(75) Inventor: Dae-Hyun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1279 days.

(21) Appl. No.: 11/653,935

(22) Filed: Jan. 17, 2007

(65) Prior Publication Data

US 2007/0268507 A1    Nov. 22, 2007

(30) Foreign Application Priority Data

May 18, 2006   (KR) .................... 10-2006-0044636

(51) Int. Cl.
  *G06F 15/00*   (2006.01)
  *G06F 17/00*   (2006.01)
(52) U.S. Cl. ...................... 358/1.15; 715/234
(58) Field of Classification Search .............. 358/1.15, 358/1.14, 1.13, 1.2, 2.1, 1.6, 1.18, 1.9, 401, 358/1.3; 715/221, 274, 760, 234; 709/218, 709/209, 203, 230, 206, 217; 348/207.2, 348/211.3; 455/41.3, 566, 557
See application file for complete search history.

(56) References Cited

U.S. PATENT DOCUMENTS

2004/0253990 A1*  12/2004  McCoog et al. ............. 455/566
2005/0278619 A1*  12/2005  Kim et al. ..................... 715/513

FOREIGN PATENT DOCUMENTS

CN        1172281 A    4/1998
EP    1 489 813 A1   12/2004

* cited by examiner

*Primary Examiner* — Saeid Ebrahimi Dehkordy
(74) *Attorney, Agent, or Firm* — Roylance, Abrams, Berdo & Goodman, L.L.P.

(57) ABSTRACT

A method and system are provided for printing content according to print capabilities of a network of image forming apparatuses using a device. At least one image forming apparatus forming a network with the device is searched and a list is provided of at least one extensible hyper text markup language (XHTML)-Print template, which can be processed by an image forming apparatus selected from among the searched image forming apparatuses. XHTML-Print data of content is created using an XHTML-Print template selected from the list of XHTML-Print templates and the created XHTML-Print data is transmitted to the selected image forming apparatus. The transmitted XHTML-Print data is analyzed and the content printed. Accordingly, printing is performed by supporting specific XHTML-Print templates for providing functions, differentiated according to types of image forming apparatus, as well as supporting limited XHTML-Print templates applicable to all image forming apparatuses.

27 Claims, 6 Drawing Sheets

METHOD AND SYSTEM FOR PRINTING CONTENT ACCORDING TO PRINT CAPABILITIES OF IMAGE FORMING APPARATUSES USING A DEVICE

CROSS-REFERENCE TO RELATED PATENT APPLICATIONS

This application claims the benefit under 35 U.S.C. §119 (a) of Korean Patent Application No. 10-2006-0044636, filed May 18, 2006, in the Korean Intellectual Property Office, the entire disclosure of which is hereby incorporated by reference.

BACKGROUND OF THE INVENTION

1. Field of the Invention

The present invention relates to a method and system for providing print functions. In particular, the present invention relates to a method and system for providing print functions differentiated according to print information about image forming apparatuses obtained by using a device such as a cellular phone.

2. Description of the Related Art

In a conventional method of printing content (e.g., images) via an image forming apparatus (e.g., a photo printer) using a device such as a cellular phone, for example, a user selects whether extensible hyper text markup language (XHTML)-Print data is used, or whether images such as JPEG images are directly printed. The user also directly selects a printer paper size or an image size.

In another conventional method in which various layouts are supported, the user creates XHTML-Print data by directly selecting a template stored in the device (e.g., a cellular phone), and the created XHTML-Print data is transmitted to a printer and printed.

According to the development of mobile devices having Bluetooth and Wireless Universal Serial Bus (WUSB) functions, a trend has developed whereby users demand various print functions, and manufacturers of image forming apparatuses manage a strategy for differentiating their products from products of other manufacturers according to user demand. However, since a large technological gap exists between manufacturers, specific manufacturers develop image forming apparatuses that can process simple XHTML-Print data supporting only basic layouts, while leading manufacturers develop image forming apparatuses that can process complex and difficult XHTML-Print data to provide various splendid or complex layouts.

Thus, even if mobile devices support conventional methods of printing, various layouts cannot be provided to users. In other words, even if an XHTML-Print interpreter provided by manufacturers of high performance image forming apparatuses for printing various layouts can support complex layouts using a plurality of tags, a sufficient function of the XHTML-Print interpreter cannot be provided to users. That is, since mobile device makers must support different levels of XHTML-Print data provided by image forming apparatus manufacturers, the mobile device manufacturers cannot help but create simple content using a commonly printable template level. Thus, users cannot sufficiently use a print function using XHTML-Print data. This results in the leading manufacturers of image forming apparatuses not being able to gain in product differentiation.

SUMMARY OF THE INVENTION

Exemplary embodiments of the present invention provide a method and system for printing content according to print capabilities of image forming apparatuses using a device supporting specific extensible hyper text markup language (XHTML)-Print templates for providing functions differentiated according to types of image forming apparatuses, as well as supporting limited XHTML-Print templates applicable to all image forming apparatuses.

According to exemplary embodiments of the present invention, a method is provided of printing content according to print capabilities of image forming apparatuses using a device. The method comprises searching at least one image forming apparatus forming a network with the device and providing a list of at least one extensible hyper text markup language (XHTML)-Print template, which can be processed by an image forming apparatus selected from among the searched at least one image forming apparatus. The method further comprises creating XHTML-Print data of content using an XHTML-Print template selected from the list of at least one XHTML-Print template and transmitting the created XHTML-Print data to the selected image forming apparatus, and analyzing the transmitted XHTML-Print data and printing the content.

According to exemplary embodiments of the present invention, a system is provided for printing content according to print capabilities of image forming apparatuses using a device. The system comprises the device searching at least one image forming apparatus forming a network, providing a list of at least one extensible hyper text markup language (XHTML)-Print template, which can be processed by an image forming apparatus selected from among the searched at least one image forming apparatus, and creating XHTML-Print data of content using an XHTML-Print template selected from the list of at least one XHTML-Print template. The system further comprises an image forming apparatus analyzing XHTML-Print data transmitted from the device and printing the content.

BRIEF DESCRIPTION OF THE DRAWINGS

The above and other exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

The following description directed to an extensible hyper text markup language (XHTML)-Print document can also be applied to XHTML documents, and markup documents having other formats.

Figure 1:
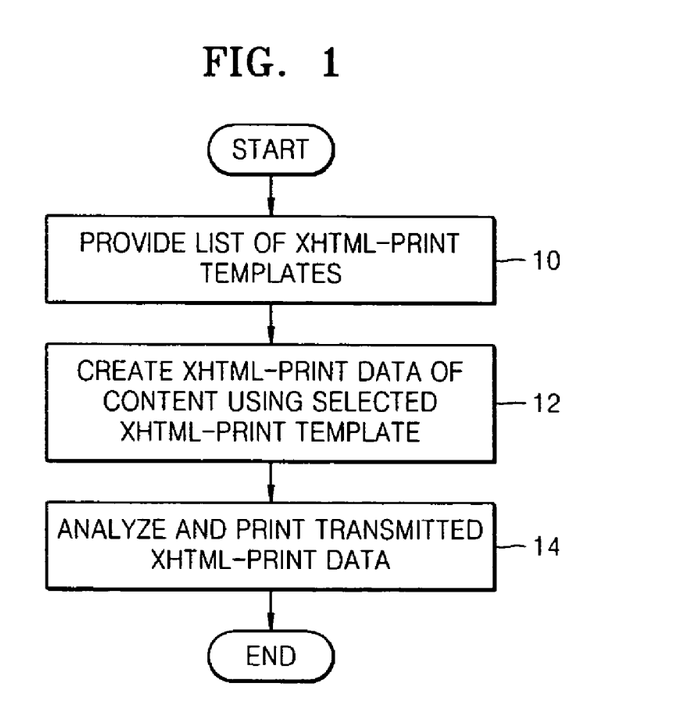
FIG. 1 is a flowchart illustrating a method of printing content according to print capabilities of image forming apparatuses using a device according to an exemplary embodiment of the present invention.

FIG. 1 is a flowchart illustrating a method of printing content according to print capabilities of image forming apparatuses using a device according to an exemplary embodiment of the present invention.

Referring to FIG. 1, at least one image forming apparatus that forms a network with a device is searched, and a list of at least one extensible hyper text markup language (XHTML)-Print template, which can be processed by an image forming apparatus selected from among the searched image forming apparatuses, is provided, step 10.

Figure 2:
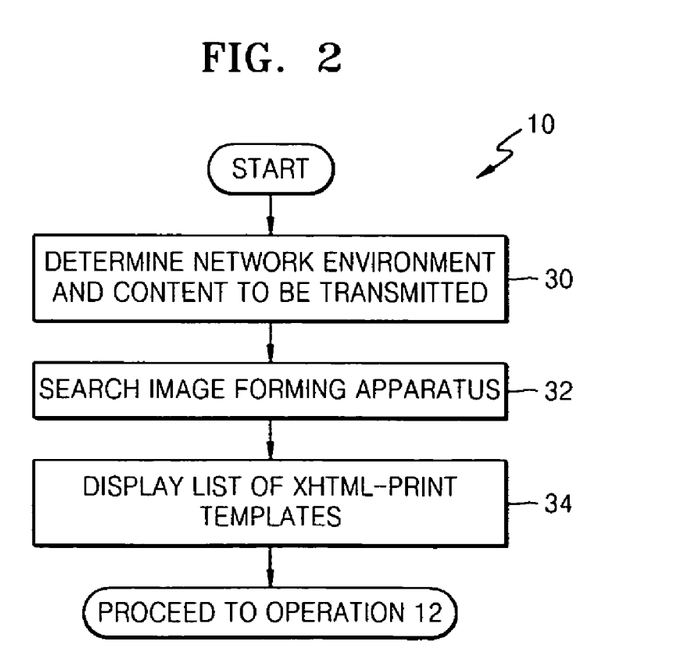
FIG. 2 is a flowchart illustrating a process of the exemplary embodiment of FIG. 1, in which a list of extensible hyper text markup language (XHTML)-Print templates is provided, according to an exemplary embodiment of the present invention.

FIG. 2 is a flowchart illustrating step 10 of the exemplary embodiment of FIG. 1, according to an exemplary embodiment of the present invention.

Referring to FIG. 2, a network environment between the device and the at least one image forming apparatus, and content to be transmitted to the selected image forming apparatus are determined, step 30.

The network environment, for example, indicates a communication protocol between the device and the at least one image forming apparatus. The communication protocol may be a wired protocol, such as a Universal Serial Bus (USB) protocol, or a wireless protocol, such as a Bluetooth protocol or a Wireless USB (WUSB) protocol. A protocol from among the wired protocols and the wireless protocols is determined as the network environment. Content to be printed is also determined.

Next, image forming apparatuses corresponding to the determined network environment are searched, step 32.

Figure 3:
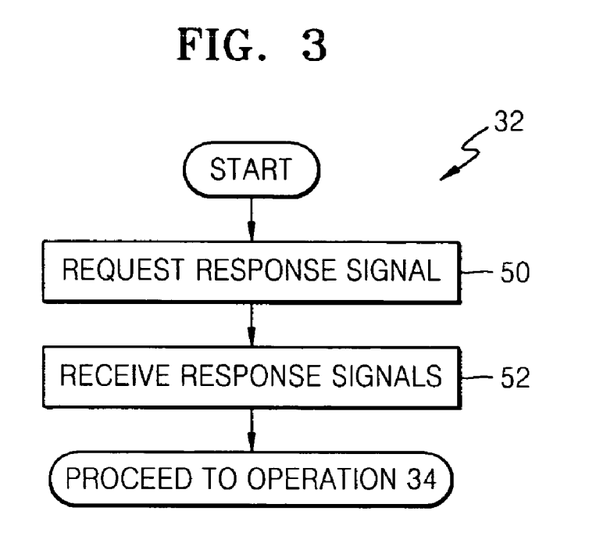
FIG. 3 is a flowchart illustrating a process of the exemplary embodiment of FIG. 2, in which image forming apparatuses are searched, according to an exemplary embodiment of the present invention.

FIG. 3 is a flowchart illustrating step 32 of the exemplary embodiment of FIG. 2, according to an exemplary embodiment of the present invention.

Referring to FIG. 3, a response signal is requested from image forming apparatuses connected to the device using the network environment, step 50. The response signal is a signal for recognizing each image forming apparatus connected to the device. If a wireless protocol is determined as the network environment protocol, a response signal is requested from image forming apparatuses connected to the device using the determined wireless protocol.

Next, response signals are received from the image forming apparatuses connected to the device, step 52. If the image forming apparatuses connected to the device receive a response request signal, each of the image forming apparatuses connected to the device transmit a response signal to the device. In an exemplary implementation, the image forming apparatuses connected to the device transmit their identification (ID) information with the response signal to the device. The ID information contains an image forming apparatus manufacturer's name or a product name. The image forming apparatuses that have transmitted a response signal are recognized as the searched image forming apparatuses.

Referring back to FIG. 2, a list of XHTML-Print templates that can be processed by an image forming apparatus selected from among the searched image forming apparatuses is displayed, step 34.

Figure 4:
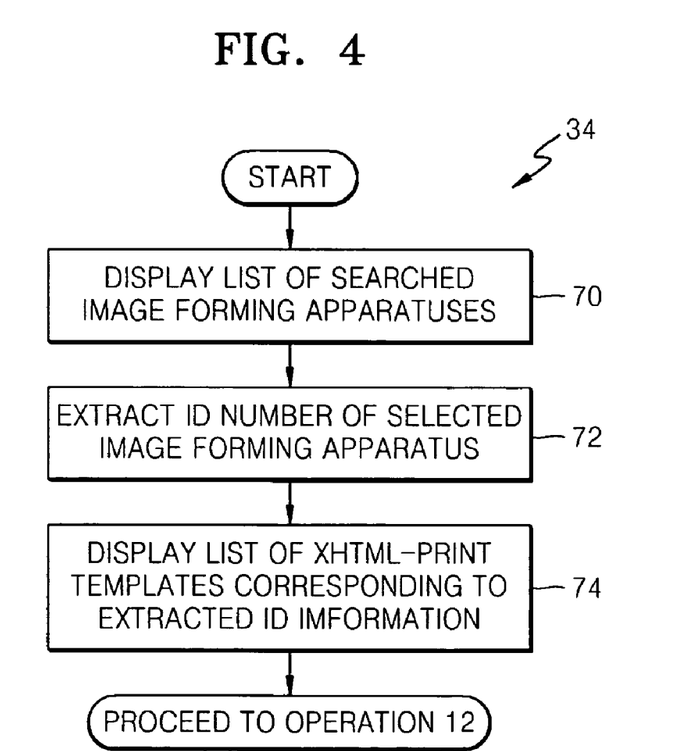
FIG. 4 is a flowchart illustrating a process of the exemplary embodiment of FIG. 2, in which a list of XHTML-Print templates is displayed, according to an exemplary embodiment of the present invention.

FIG. 4 is a flowchart illustrating step 34 of the exemplary embodiment of FIG. 2, according to an exemplary embodiment of the present invention.

Referring to FIG. 4, a list of the searched image forming apparatuses is displayed, step 70. A list of the image forming apparatuses that have transmitted a response signal is displayed on the device.

Next, an ID number of an image forming apparatus selected from the displayed list is extracted, step 72. If a user selects a specific image forming apparatus from the displayed list, ID information transmitted with the response signal is extracted from the selected specific image forming apparatus. If the ID information transmitted with the response signal is a manufacturer's name or a product name, the ID information is compared to ID information corresponding to image forming apparatuses, which is stored in the device, and as a result of the comparison, ID information of an image forming apparatus that is managed by the device is extracted.

Next, a list of XHTML-Print templates corresponding to the extracted ID information is displayed, step 74. Types of XHTML-Print templates that can be processed by image forming apparatuses differ according to the image forming apparatuses. Thus, a list of XHTML-Print templates that can be processed by the image forming apparatus selected by the user is displayed to the user.

Referring back to FIG. 1, XHTML-Print data of content is created using an XHTML-Print template selected from the displayed XHTML-Print template list, and the created XHTML-Print data is transmitted to the selected image forming apparatus, step 12. The user selects an XHTML-Print template to be printed from the displayed XHTML-Print template list and inputs option values to be used for the selected XHTML-Print template. The option values are, for example, a print paper size and an image size. XHTML-Print data of content to be printed is created using the XHTML-Print template and option value selected by the user. The created XHTML-Print data is transmitted to the image forming apparatus selected by the user.

Next, the image forming apparatus selected by the user analyzes the XHTML-Print data transmitted from the device and prints the content, step 14.

Figure 5:
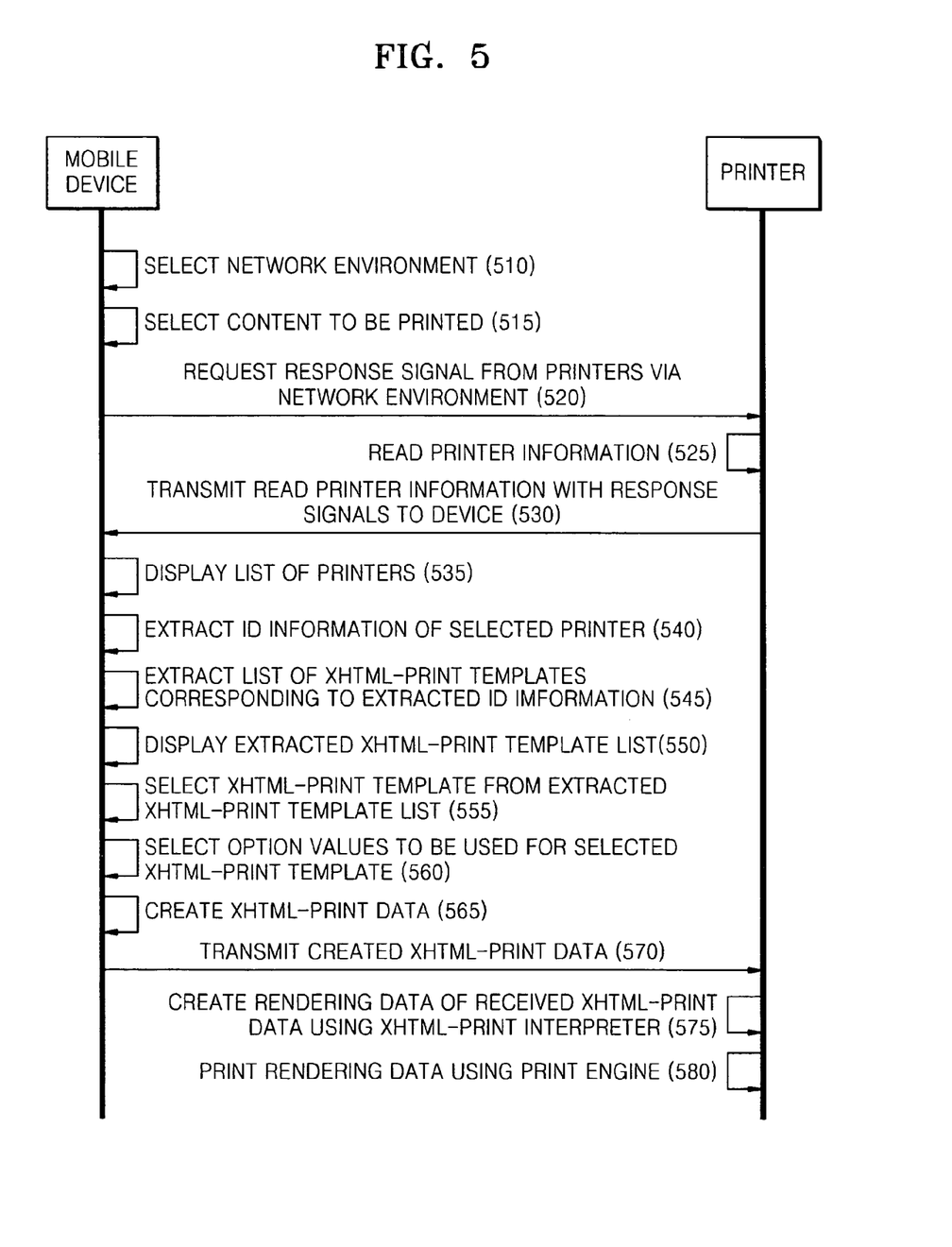
FIG. 5 is a signaling diagram for explaining an information exchange between a device and an image forming apparatus according to an exemplary embodiment of the present invention.

FIG. 5 is a signaling diagram for explaining an information exchange between a device and an image forming apparatus according to an exemplary embodiment of the present invention.

Referring to FIG. 5, the device selects a network environment protocol, that is, a communication protocol, step 510, and content to be printed, step 515. The device requests a response signal from printers connected thereto through the network environment, step 520. The printers, which have received the request, read printer information, for example, ID information of the printers, to be transmitted to the device, step 525. The printers transmit the read ID information with response signals to the device, step 530. The device displays a list of the printers from which the response signals are received, step 535. A user then selects a printer to be used for printing from the displayed printer list. The device extracts ID information of the printer selected by the user, step 540, extracts a list of XHTML-Print templates corresponding to the extracted ID information, step 545, and displays the extracted XHTML-Print template list, step 550. When the user selects one of the displayed XHTML-Print templates, step 555, and selects option values, step 560, the device creates XHTML-Print data corresponding to the selected XHTML-Print template and option values, step 565. The device transmits the created XHTML-Print data to the selected printer, step 570. The selected printer analyzes the received XHTML-Print data and creates rendering data using XHTML-Print interpreter, step 575), and prints the analyzed XHTML-Print data using a print engine, step 580.

Figure 6A:
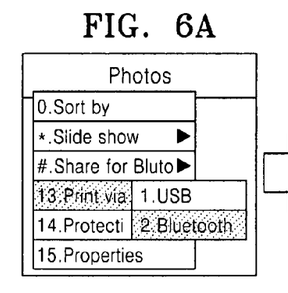
FIGS. 6A through 6F illustrate dialog boxes displayed by the device while performing the method described in the exemplary embodiment of FIG. 1, according to an exemplary embodiment of the present invention.
Figure 6B:
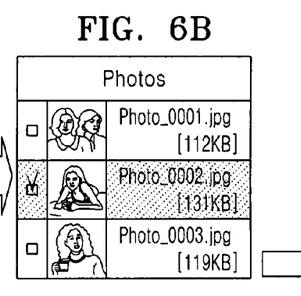
Figures 6C, 6D, 6E:
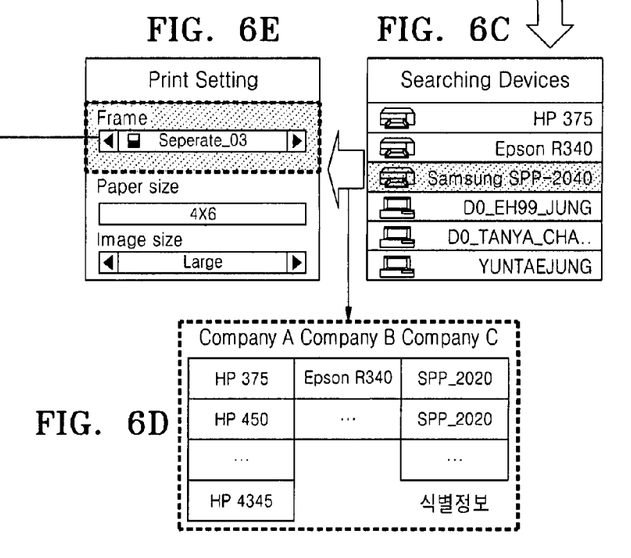
Figure 6F:
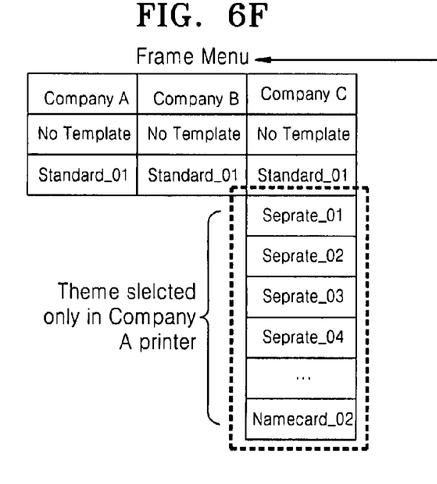

FIGS. 6A through 6F illustrate dialog boxes displayed by the device while performing the method described in the exemplary embodiment of FIG. 1, according to an exemplary embodiment of the present invention. FIG. 6A illustrates a dialog box for selecting a communication protocol to be used between the device and the image forming apparatuses, FIG. 6B illustrates a dialog box for selecting content to be printed using an image forming apparatus, FIG. 6C illustrates a dialog box in which a list of searched image forming apparatuses is displayed, FIG. 6D illustrates ID information of image forming apparatuses, which is stored in the device in order to extract ID information of an image forming apparatus selected by the user, FIG. 6E illustrates a dialog box for selecting an XHTML-Print template from a list of XHTML-Print templates, which can be processed by the selected image forming apparatus, and FIG. 6F illustrates a displayed list of the XHTML-Print templates, which can be processed by the selected image forming apparatus. The XHTML-Print templates illustrated in FIG. 6F are classified according to manufacturers. Since the user can view XHTML-Print templates, which can be processed by the selected image forming apparatus, the user can select an XHTML-Print template as desired. When the user selects a specific XHTML-Print template from the XHTML-Print template list illustrated in FIG. 6F, XHTML-Print data is created using the selected specific XHTML-Print template. When the created XHTML-Print data is transmitted to the selected image forming apparatus, the selected image forming apparatus analyzes and prints the received XHTML-Print data.

Figures 7A, 7B:
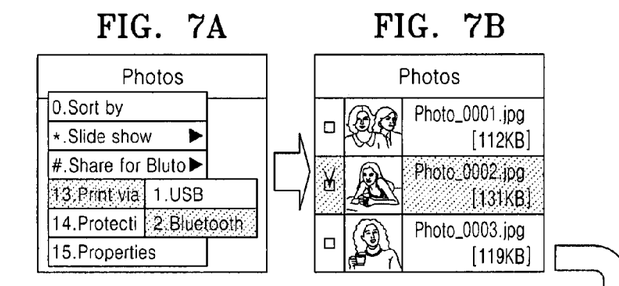
FIGS. 7A through 7E illustrate dialog boxes displayed by the device while performing the method described in the exemplary embodiment of FIG. 1, according to another exemplary embodiment of the present invention.
Figures 7C, 7D, 7E:
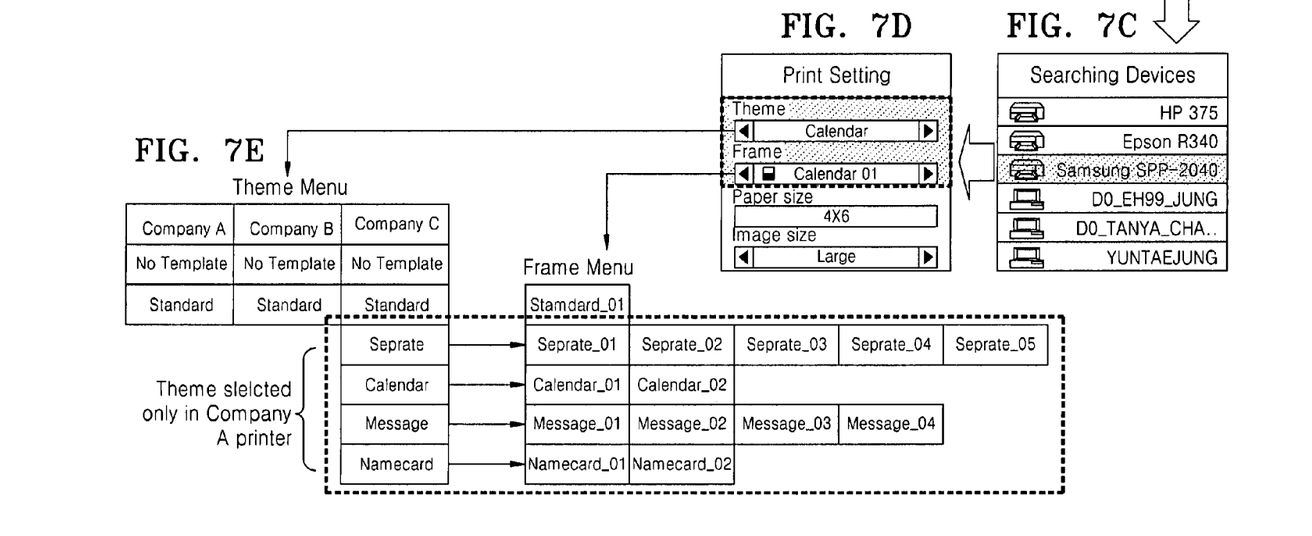

FIGS. 7A through 7E illustrate dialog boxes displayed by the device while performing the method described in the exemplary embodiment of FIG. 1, according to another exemplary embodiment of the present invention. Since FIGS. 7A through 7C are the same as FIGS. 6A through 6C, a detailed description of FIGS. 7A through 7C is omitted. FIG. 7D illustrates a dialog box for selecting an XHTML-Print template from a list of XHTML-Print templates, which can be processed by the selected image forming apparatus, and FIG. 7E illustrates a displayed list of the XHTML-Print templates, which can be processed by the selected image forming apparatus. Unlike FIG. 6E, FIG. 7D illustrates a different method of selecting an XHTML-Print template. That is, since the XHTML-Print template list displayed in FIG. 7E is hierarchically classified, to select a desired XHTML-Print template from among the XHTML-Print templates of the hierarchically structured list, an XHTML-Print template selection menu arranged by "Theme" and "Frame" is provided. When the user selects a specific XHTML-Print template from the XHTML-Print template list illustrated in FIG. 7E, XHTML-Print data is created using the selected specific XHTML-Print template. When the created XHTML-Print data is transmitted to the selected image forming apparatus, the selected image forming apparatus analyzes and prints the received XHTML-Print data.

Certain exemplary embodiments of the present invention can be written as computer-readable code/instructions/programs and can be implemented in digital computers that execute the code/instructions/programs using a computer readable medium. Examples of a computer readable medium include magnetic storage media (for example, ROM, floppy disks, hard disks, among others), random-access memory (RAM), optical recording media for example, CD-ROMs, or DVDs), and storage media such as carrier waves (for example, transmission through the Internet). The computer readable medium can also be distributed over network coupled computer systems so that the computer readable code/instructions/programs is stored and executed in a distributed fashion. Further, functional programs, code, and code segments for accomplishing the present invention can be easily construed by programmers skilled in the art to which the present invention pertains.

Figure 8:
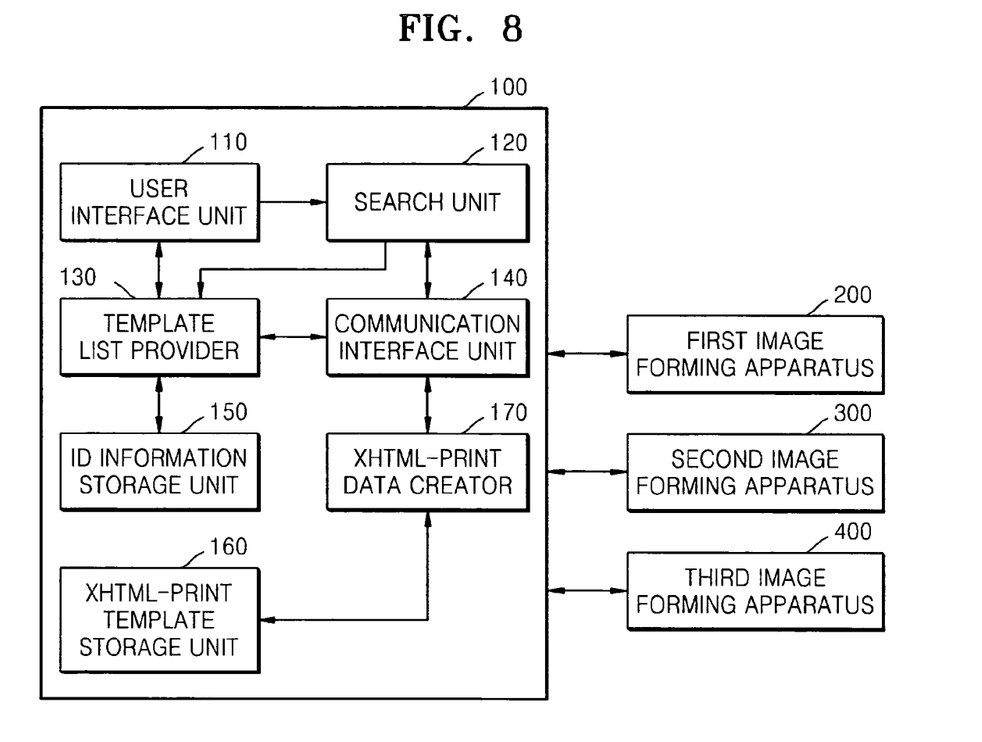
FIG. 8 is a block diagram of a system for printing content according to print capabilities of image forming apparatuses using a device according to another exemplary embodiment of the present invention.

FIG. 8 is a block diagram of a system for printing content according to print capabilities of image forming apparatuses using a device according to another exemplary embodiment of the present invention. Referring to FIG. 8, the system includes a device 100, a first image forming apparatus 200, a second image forming apparatus 300, and a third image forming apparatus 400.

The device 100 searches at least one image forming apparatus 200, 300, and 400 which form a network, provides a list of at least one XHTML-Print template, which can be processed by an image forming apparatus selected from among the searched image forming apparatuses 200, 300, and 400, and creates XHTML-Print data using a selected XHTML-Print template. The device 100 includes a user interface unit 110, a search unit 120, a template list provider 130, a communication interface unit 140, an ID information storage unit 150, an XHTML-Print template storage unit 160, and an XHTML-Print data creator 170.

The user interface unit 110 determines a network environment between the device 100 and the image forming apparatuses 200, 300, and 400, determines content to be transmitted to the image forming apparatus 200, 300, or 400, and outputs the determination result to the search unit 120. In particular, the user interface unit 110 determines a communication protocol between the device 100 and the image forming apparatuses 200, 300, and 400 as the network environment protocol.

The search unit 120 searches the image forming apparatuses 200, 300, and 400 corresponding to the network environment determined through the user interface unit 110. The search unit 120 requests a response signal from the image forming apparatuses 200, 300, and 400 connected to the device 100 via the network environment, receives response signals from the image forming apparatuses 200, 300, and 400, and outputs the received response signals to the template list provider 130. The search unit 120 receives ID information of the image forming apparatuses 200, 300, and 400 with the response signals and also outputs the received ID information to the template list provider 130. In an exemplary implementation, the ID information indicates an image forming apparatus manufacturer or a product name. The search unit 120 determines the image forming apparatuses 200, 300, and 400, which have transmitted the response signals, as searched image forming apparatuses. The signal for requesting the response signal and the response signals are interfaced through the communication interface unit 140.

The communication interface unit 140 interfaces a data exchange between the device 100 and the image forming apparatuses 200, 300, and 400. In particular, the communication interface unit 140 interfaces the signal for requesting the response signal and the response signals of the search unit 120 and transmits XHTML-Print data created by the XHTML-Print data creator 170 to an image forming apparatus selected from among the image forming apparatuses 200, 300, and 400.

The ID information storage unit 150 stores the ID information of the image forming apparatuses 200, 300, and 400. In an exemplary implementation, the ID information is information managed in order that the device 100 can identify the image forming apparatuses 200, 300, and 400. Table 1 illustrates an example of ID information of image forming apparatuses, which is stored in the ID information storage unit 150.

TABLE 1

| Printer ID | USB/WUSB | | Bluetooth | | | |
| --- | --- | --- | --- | --- | --- | --- |
| | VID | PID | UAP | NAP | LAP | |
| 0x0000 0001 | 0x0001 | 0x000A | 0x00 | 0x04EA | 0x000003 | Company A |
| 0x0000 0002 | 0x0001 | 0x000F | 0x00 | 0x04EA | 0x000014 | |
| 0x0001 0001 | 0x00F0 | 0x1002 | 0x00 | 0x0048 | 0x131313 | Company B |
| 0x0002 0001 | 0x00C0 | 0xF035 | 0x00 | 0x00F0 | 0x0000A1 | Company C |
| 0x0002 0002 | 0x00C0 | 0xF155 | 0x00 | 0x00F0 | 0x00003F | |
| 0x0002 0003 | 0x00C0 | 0xF0AB | 0x00 | 0x00F0 | 0xA00021 | |

As illustrated in Table 1, ID information of image forming apparatuses made by different manufacturers is stored.

The template list provider 130 displays a list of XHTML-Print templates, which can be processed by an image forming apparatus selected by the user, from among the image forming apparatuses 200, 300, and 400 searched by the search unit 120, by referring to the ID information stored in the ID information storage unit 150 and XHTML-Print templates stored in the XHTML-Print template storage unit 160.

Figure 9:
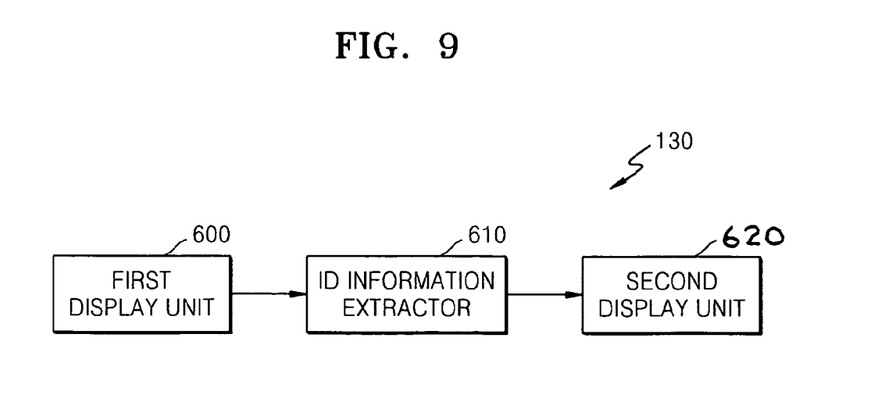
FIG. 9 is a block diagram of a template list provider illustrated in the exemplary embodiment of FIG. 8, according to an exemplary embodiment of the present invention.

FIG. 9 is a block diagram of the template list provider 130 of the exemplary embodiment of FIG. 8, according to an exemplary embodiment of the present invention. Referring to FIG. 9, the template list provider 130 includes a first display unit 600, an ID information extractor 610, and a second display unit 620.

The first display unit 600 displays a list of the searched image forming apparatuses 200, 300, and 400 and receives selection information about a specific image forming apparatus selected by the user.

The ID information extractor 610 extracts ID information of an image forming apparatus, which is selected from the list of the image forming apparatuses 200, 300, and 400 displayed by the first display unit 600, from the ID information storage unit 150 and outputs the extraction result to the second display unit 620.

The second display unit 620 displays a list of XHTML-Print templates corresponding to the extracted ID information by referring to the XHTML-Print templates stored in the XHTML-Print template storage unit 160.

Referring back to FIG. 8, the XHTML-Print template storage unit 160 stores the XHTML-Print templates corresponding to the ID information of the image forming apparatuses 200, 300, and 400 and outputs an XHTML-Print template requested by the communication interface unit 140 to the XHTML-Print data creator 170.

The XHTML-Print data creator 170 reads the XHTML-Print template selected from the displayed XHTML-Print template list stored in the XHTML-Print template storage unit 160 and creates XHTML-Print data of content using the read XHTML-Print template. If option values to be used for the selected XHTML-Print template are input through the user interface unit 1110, the XHTML-Print data creator 170 creates XHTML-Print data corresponding to the input option values and outputs the created XHTML-Print data to the communication interface unit 140. The communication interface unit 140 transmits the XHTML-Print data to the image forming apparatus selected from among the first, second, and third image forming apparatuses 200, 300, and 400. When the first, second, and third image forming apparatuses 200, 300, and 400 receive the signal for requesting a response signal from the search unit 120, each of the first, second, and third image forming apparatuses 200, 300, and 400 transmits a response signal with its ID information to the device 100. The ID information transmitted by the first, second, and third image forming apparatuses 200, 300, and 400 may contain a manufacturer's name or product name.

One of the selected first, second, and third image forming apparatuses 200, 300, and 400 analyzes the XHTML-Print data transmitted from the device 100 and prints the content.

As described above, according to exemplary embodiments of the present invention, by supporting specific XHTML-Print templates for providing functions differentiated according to types of image forming apparatuses as well as supporting limited XHTML-Print templates applicable to all image forming apparatuses (for example, printers and multi-function peripherals (MFPs)), more layouts desired by a user can be printed, and manufacturers of image forming apparatuses can appeal to customers based on the excellence of their XHTML-Print Interpreters.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A method of printing according to print capabilities of image forming apparatuses using a device, the method comprising:
    searching at least one image forming apparatus forming a network with the device;
    receiving a list of at least one print template that can be processed by an image forming apparatus selected from among the searched at least one image forming apparatus;
    displaying the received list of at least one print template;
    creating extensible hyper text markup language (XHTML)-Print data and XHTML-data related to information of the print template selected from the list of at least one print template;
    transmitting the created XHTML-Print data and the created XHTML-data to the selected image forming apparatus; and
    analyzing the transmitted XHTML-Print data and the transmitted XHTML-data.

2. The method of claim 1, further comprising:
determining a network environment between the device and the at least one image forming apparatus; and
determining content to be transmitted to the selected image forming apparatus;
wherein the searching of the at least one image forming apparatus searches the image forming apparatus corresponding to the determined network environment.

3. The method of claim 2, wherein a communication protocol between the device and the image forming apparatus is determined as the network environment.

4. The method of claim 1, wherein the searching of the at least one image forming apparatus comprises:
requesting a response signal from the at least one image forming apparatus connected to the device via the network environment; and
receiving the response signal from the at least one image forming apparatus connected to the device,
wherein the at least one image forming apparatus that has transmitted the response signals is determined as the searched image forming apparatus.

5. The method of claim 4, wherein the receiving of the response signal comprises receiving identification (ID) information of the at least one image forming apparatus connected to the device that received the response signal.

6. The method of claim 5, wherein the received ID information comprises a manufacturer's name or a product name.

7. The method of claim 1, wherein the displaying of the list of the at least one print template comprises:
displaying the searched image forming apparatus in a list;
extracting ID information of an image forming apparatus selected from the displayed list; and
displaying the list of print templates corresponding to the extracted ID information.

8. The method of claim 1, wherein the creating of the XHTML-data comprises receiving an option value to be used for the selected print template and creating the XHTML-data corresponding to the received option value.

9. A non-transitory computer readable medium storing a computer readable program for executing the method of claim 1.

10. A system for printing according to print capabilities of image forming apparatuses using a device, the system comprising:
a device searching at least one image forming apparatus forming a network with the device, receiving a list of at least one print template that can be processed by an image forming apparatus selected from among the searched at least one image forming apparatus, displaying the received list of at least one print template, and creating extensible hyper text markup language (XHTML)-Print data and XHTML-data related to information of the print template selected from the list of at least one print template; and
an image forming apparatus analyzing XHTML-Print data and XHTML-data transmitted from the device.

11. The system of claim 10, wherein the device comprises:
a user interface unit for determining a network environment between the device and the at least one image forming apparatus and determining content to be transmitted to the selected image forming apparatus;
a search unit for searching the at least one image forming apparatus corresponding to the determined network environment; and
an identification (ID) information storage unit for storing ID information of the at least one image forming apparatus;
an XHTML-Print template storage unit for storing print templates corresponding to the ID information of the at least one image forming apparatus;
a template list provider for displaying the list of print templates that can be processed by an image forming apparatus selected from among the searched at least one image forming apparatus by referring to the stored ID information and the stored print template;
an XHTML-Print data creator for reading a print template selected from the displayed print template list from the XHTML-Print template storage unit and creating XHTML-Print data and XHTML-data related to information of the read print template; and
a communication interface unit for interfacing a data exchange between the device and the at least one image forming apparatus.

12. The system of claim 11, wherein a communication protocol between the device and the at least one image forming apparatus is determined as the network environment protocol.

13. The system of claim 11, wherein the search unit requests a response signal from the at least one image forming apparatus connected to the device via the network environment and determines the at least one image forming apparatus that has transmitted the response signals as the searched image forming apparatuses.

14. The system of claim 11, wherein the template list provider comprises:
a first display unit for displaying the searched image forming apparatus in a list;
an ID information extractor for extracting ID information of an image forming apparatus selected from the displayed list of the at least one image forming apparatus from the ID information storage unit; and
a second display unit for displaying the list of print templates corresponding to the extracted ID information.

15. The system of claim 11, wherein the XHTML-Print data creator receives an option value to be used for the selected print template and creates the XHTML-data corresponding to the received option value.

16. The system of claim 10, wherein the at least one image forming apparatus transmits its identification (ID) information with a response signal to the device.

17. The system of claim 16, wherein the ID information transmitted from image forming apparatus comprises a manufacturer's name or a product name.

18. The method of claim 5, wherein the received ID information comprises at least one of a manufacturer's name and a product name.

19. A method of printing content according to print capabilities of image forming apparatuses using a device, the method comprising:
determining a network environment between the device and an image forming apparatus;
searching the image forming apparatuses to select one therefrom that corresponds to the determined network environment;
determining content to be printed via the selected one of the image forming apparatuses; and
displaying a list of print templates that can be processed by the selected one of the image forming apparatuses.

20. The method of claim 19, wherein searching the image forming apparatuses to select one therefrom that corresponds to the determined network environment comprises:
requesting a response signal from the image forming apparatuses;

receiving response signals transmitted from the image forming apparatuses connected to the device;

displaying a list of the image forming apparatuses that have transmitted a response signal as searched image forming apparatuses; and selecting an image forming apparatus from the displayed list of searched image forming apparatuses.

21. The method of claim 20, further comprising obtaining identifier (ID) information of the selected one of the image forming apparatuses.

22. The method of claim 21, wherein the ID information is transmitted with the response signal from the selected one of the image forming apparatuses.

23. The method of claim 21, further comprising displaying the list of print templates corresponding to the extracted ID information.

24. The method of claim 23, further comprising:

creating XHTML-Print data and XHTML-data related to information of the print template selected from the list of print templates; and transmitting the created XHTML-Print data and the created XHTL-data to the selected image forming apparatus.

25. The method of claim 20, wherein the network environment is a communication protocol selected from the group consisting of Bluetooth, Universal Serial Bus (USB) and Wireless USB.

26. A device for printing content according to print capabilities of image forming apparatuses connected thereto, the device comprising:

a programmed processing device for selecting a network environment protocol and content to be printed, and for requesting response signals from image forming apparatuses connected to the device via the selected network environment protocol;

a communication interface for receiving the response signals transmitted to the device by the image forming apparatuses, the response signals comprising identifier (ID) information for the respective ones of the image forming apparatuses transmitting the response signals, the processing device being operable to identify the image forming apparatuses using the ID information;

a display device connected to the processing device and operable to display a list of image forming apparatuses from which the response signals were received, and a user interface with which to select one of listed image forming apparatuses;

wherein the processing device is further programmed to extract a list of print templates corresponding to the selected one of the image forming apparatuses.

27. The device of claim 26, wherein the processing device is further configured to create XHTML-data related to information of a selected one of the print templates.

* * * * *